US008521477B2

(12) United States Patent
Nam

(10) Patent No.: US 8,521,477 B2
(45) Date of Patent: Aug. 27, 2013

(54) METHOD FOR SEPARATING BLIND SIGNAL AND APPARATUS FOR PERFORMING THE SAME

(75) Inventor: Seung Hyon Nam, Daejeon (KR)

(73) Assignees: Electronics and Telecommunications Research Institute, Daejeon (KR); Paichai University Industry-Academic Cooperation Foundation, Daejeon (KR)

( * ) Notice: Subject to any disclaimer, the term of this patent is extended or adjusted under 35 U.S.C. 154(b) by 292 days.

(21) Appl. No.: 12/971,430

(22) Filed: Dec. 17, 2010

(65) Prior Publication Data

US 2011/0149719 A1 Jun. 23, 2011

(30) Foreign Application Priority Data

Dec. 18, 2009 (KR) ........................ 10-2009-0127541
Oct. 25, 2010 (KR) ........................ 10-2010-0104197

(51) Int. Cl.
*H04B 15/00* (2006.01)

(52) U.S. Cl.
USPC .......................................................... 702/196

(58) Field of Classification Search
USPC ................. 702/190, 179, 189, 196; 708/404, 708/405; 367/124, 125; 370/210; 703/11
See application file for complete search history.

(56) References Cited

U.S. PATENT DOCUMENTS 7,496,482 B2 * 2/2009 Araki et al. .................... 702/190
7,647,209 B2 * 1/2010 Sawada et al. ................ 702/190
2003/0046038 A1 * 3/2003 Deligne et al. ................ 702/190
2005/0203981 A1 * 9/2005 Sawada et al. ................ 708/322
2006/0058983 A1 * 3/2006 Araki et al. .................... 702/190
2007/0025556 A1 * 2/2007 Hiekata ........................... 381/17
2008/0215651 A1 * 9/2008 Sawada et al. ................ 708/205
2009/0022403 A1 * 1/2009 Takamori et al. ............. 382/195
2009/0136057 A1 * 5/2009 Taenzer .......................... 381/74
2009/0310444 A1 * 12/2009 Hiroe ............................ 367/125
2011/0149719 A1 * 6/2011 Nam ............................. 370/210

OTHER PUBLICATIONS

Sawada et al. "Grouping Separated Frequency Components by Estimating Propagation Model Parameters in Frequency-Domain Blind Source Separation," in IEEE Transactions on Audio, Speech, and Language Processing, vol. 15, No. 5, Jul. 2007, pp. 1592-1604.*
Knapp et al. "The generalized correlation method for estimation of time delay," IEEE Trans. Acoust., Speech, Signal Process., vol. ASSP-24, No. 4, pp. 320-327, Aug. 1976.*
Anthony J. Bell, Terrence J. Sejnowski, "An Information-Maximization Approach to Blind Separation and Blind Deconvolution", Neural Computation, vol. 7, pp. 1129-1159, 1995, Massachusetts Institute of Technology.
Hiroshi Sawada, Shoko Araki, Ryo Mukai, Shoji Makino, "Solving the Permutation Problem of Frequency-Domain BSS When Spatial Aliasing Occurs With Wide Sensor Spacing", ICASSP, pp. 77-80, 2006, IEEE.

* cited by examiner

*Primary Examiner* — Ricky Ngo
*Assistant Examiner* — Michael Phillips
(74) *Attorney, Agent, or Firm* — Kile Park Reed & Houtteman PLLC

(57) ABSTRACT

A method for separating a blind signal includes: converting mixed signals of a time domain collected by using a plurality of sensors into mixed signals of a frequency domain; calculating a separation filter from the mixed signals which have been converted into those of the frequency domain; calculating an inverse filter of the separation filter; calculating the difference in phase between the respective sensors from the calculated inverse filter; permutation-sorting the separation filter by using the calculated phase difference; and separating the mixed signals of the frequency domain by using the permutation-sorted separation filter.

8 Claims, 6 Drawing Sheets

| CASE | NUMBER OF SIGNAL SOURCES | REFERENCE SENSOR | SENSOR | SIGNAL SOURCE |
|---|---|---|---|---|
| 1 | 2 | M2 | M2, M3 | S2, S4 |
| 2 | | M1 | M1, M4 | S1, S4 |
| 3 | | M1 | M1, M4 | S1, S2 |
| 4 | 3 | M1 | M1, M2, M3 | S1, S2, S3 |
| 5 | 4 | M1 | M1, M2 | S1, S2 |
| 6 | | M2 | M3, M4 | S3, S4 |

| NUMBER OF SIGNAL SOURCES | $(\tau_{m1},\ldots,\tau_{mN})$ for every m (unit: sec) |
|---|---|
| 2 | $(-1, 1)\cdot 10^{-4}$ |
| 3 | $(-1, 0, 1)\cdot 10^{-4}$ |
| 4 | $(-3, -1, 1, 3)\cdot 10^{-4}$ |

RESULTS OF SEPARATION EXPERIMENT: SIR/SDR

| CASE | EM-1 | EM-All | Sawada |
|---|---|---|---|
| 1 | 12.86/8.29 | | 12.42/8.57 |
| 2 | 11.81/8.46 | | 9.07/6.72 |
| 3 | 10.42/6.87 | | 8.20/5/70 |
| 4 | 10.18/8.03 | 11.18/8.73 | 11.41/8.94 |
| 5 | 11.78/10.64 | 12.99/11.55 | 10.58/9.52 |
| 6 | - | 13.12/11.68 | 14.21/12.52 |

FIG. 6

METHOD FOR SEPARATING BLIND SIGNAL AND APPARATUS FOR PERFORMING THE SAME

CROSS-REFERENCE TO RELATED APPLICATIONS

This application claims the priority of Korean Patent Application Nos. 10-2009-0127541 filed on Dec. 18, 2009 and 10-2010-0104197 filed on Oct. 25, 2010, in the Korean Intellectual Property Office, the disclosures of which are incorporated herein by reference.

BACKGROUND OF THE INVENTION

1. Field of the Invention

The present invention relates to a signal processing technique and, more particularly, to a blind signal separating method for separating respective signals from multi-channel multi-path mixed signals, and an apparatus for performing the same.

2. Description of the Related Art

In general, a plurality of signal sources in a multi-channel multi-path environment reach respective sensors via various paths and are mixed in the respective sensors. Among the various paths from the locations of the signal sources to the sensors, a direct path involves a time delay corresponding to relative locations of the signal sources and sensors.

An independent component analysis (ICA) technique, using the fact that signal sources are statically independent, estimates radio wave paths of signal sources from multi-channel signals and separates the signal sources, without any information regarding the signal sources provided in advance.

Also, a frequency domain ICA technique is a method in which an ICA is applied in each frequency. In this case, because the ICA is separately applied in each frequency, the separated signals are permutated, and one of the methods for solving such permutation phenomenon is utilizing direction information of the signals.

The method for separating a blind signal using the frequency domain ICA and the permutation phenomenon will now be described in detail. First, when an nth ($n=1, \ldots, N$) signal source is $s_n(t)$ and an impulse response from the nth signal source to an mth ($m=1, \ldots, M$) sensor is $h_{mn}$, mixed signals ($x_m$) collected from the mth sensor can be represented by Equation 1 shown below:

$$x_m = \sum_n h_{mn} * s_n \quad \text{[Equation 1]}$$

In Equation 1, * indicates convolution, and the impulse response $h_{mn}$ is a mixture filter administering the process of mixing the signal sources by the convolution. Signal processing is performed in a frequency domain, so mixed signals in a time domain are multiplied by a window function and then converted into signals of the frequency domain through short-time Fourier Transform.

The mixed signals in the frequency domain can be represented by Equation 2 shown below:

$$x_m(f, t) = \sum_{m=1}^{M} H_{mn}(f) s(f, t) \quad \text{[Equation 2]}$$

In Equation 2, f indicates a frequency index, t indicates a time index, and $x_m(f,t)$, $H_{mn}(f)$, $s_n(f,t)$ are those obtained as $x_m$, $h_m$, $s_n$ are Fourier-transformed, respectively. In general, the impulse response $h_{mn}$ changes over time, but hereinafter, it is assumed that the impulse response $h_{mn}$ is time-invariant for the sake of brevity.

When the signal sources and the mixed signals are defined as $s(f,t)=[s_1(f,t),s_N(f,t)]^T$ and $x(f,t)=[x_1(f,t),x_n(f,t)]^T$ in a vector form, the mixed signals can be represented by Equation 3 shown below:

$$x(f,t)=H(f)s(f,t) \quad \text{[Equation 3]}$$

In the frequency domain, ICA with respect to a complex value (CICA: Complex-valued ICA) is separately applied in each frequency to calculate a separation filter W(f). An applicable CICA method includes FastICA (E. Bingham et al., "A fast fixed-point algorithm for independent component analysis of complex-valued signals," International Journal of Neural Systems, vol. 10, no. 1, pp. 1-8, 2000) or InforMax (M. S. Pederson et al., "A survey of convolutive blind source separation methods," in Multichannel Speech Processing Handbook, Jacob Benesty and Arden Huang, Eds, Springer, 2007), and the like.

The separated signals with respect to the mixed signals are calculated as represented by Equation 4 shown below:

$$y(f,t)=W(f)x(f,t) \quad \text{[Equation 4]}$$

Because ICA is independently applied to each frequency and the statistical independence of signals is not related to the order of signals and change in amplitude of the signals, the resultantly calculated separation filters are sorted in random order in each frequency and have arbitrary sizes. These ambiguities will be referred to as permutation and scaling ambiguities. Here, the scaling ambiguity can be solved by a minimum distortion principle.

Also, various methods for solving the permutation problem of the frequency domain ICA have been proposed, and among the methods, a method of solving the permutation by using direction information of a separation filter is advantageous in that it can be employed irrespective of a type of signals and provides excellent performance.

When a far-field model, which disregards a signal echo and considers only a direct path because the distance between a sensor and a signal source are sufficiently long, is taken into account, the relationship between the direction of the signal and the mixture filter can be represented by Equation 5 shown below:

$$H_{mn}(f) = \lambda_{mn} \exp\left(\frac{j2\pi f d_m \sin(\theta_n)}{v}\right) \quad \text{[Equation 5]}$$

In Equation 5, $\lambda_m$ indicates an attenuation of a direct path, v indicates a radiowave speed of a signal, and $d_m$ and $\theta_n$ indicate the position of an mth sensor and a direction angle of an nth signal source based on the front side of the sensor when the position of a reference sensor m' is set to be 0. The ratio of the direct path can be represented by Equation 6 shown below:

$$\angle\left(\frac{h_{mn}(f)}{h_{m'n}(f))}\right) = 2\pi f\left(\frac{d_m \sin\theta_n}{v}\right) + 2\pi k = 2\pi f \tau_{mn} + 2\pi k \quad \text{[Equation 6]}$$

In Equation 6, $\tau_{mn}$ indicates a relative delay time taken for the nth signal source to reach the mth sensor based on the reference sensor m'. The phase $$\angle\left(\frac{h_{mn}(f)}{h_{m'n}(f))}\right)$$

has a value ranging from $-\pi$ to $\pi$, so when the frequency is $f \geqq 1/(2|\tau_{mn}|) \geqq v/2d_m$, aliasing occurs, and at this time, the integer k has a value not 0.

As for respective streams of the separation filter W(f) obtained from the results of ICA, spectral nulls are positioned on a spatial spectrum in the direction of the signal sources in order to remove the remaining signals other than one signal. In this sense, the separation filter has information regarding the direction of the signal sources, which is mathematically equivalent to a null-beamformer.

Meanwhile, the separation filter is the converse of the mixture filter, so $A(f)=W^{-1}(f)$ obtained by taking the converse of the separation filter is equal to the size of the mixture filter H(f) except for the permutation. Thus, based on these characteristics, a method of estimating direction information of a signal source from A(f) and sorting the rows of A(f) such that they have the same direction information as the estimated direction information has been proposed. Here, as the scheme of sorting the rows of A(f), the converse of the separation filter, a k-means clustering scheme is applied. However, when spatial aliasing occurs due to a wide frequency band of a signal or due to a large space between sensors, because the k value has a value, not 0, a one-to-one corresponding relationship is not maintained between the direction information and phase information (or time delay information), so the method cannot be employed.

To offset the shortcomings, a method of setting a mixture filter as a direct path model having a time delay and attenuation factor and clustering the rows of A(f) by using the same has been proposed. A k-means clustering scheme is also applied to this method. However, as the k-means clustering scheme does not utilize statistical characteristics, its performance may be degraded in an environment in which an echo is large or background noise is present. In addition, in order to accurately normalize a phase, the approximate size of a sensor array must be known and information regarding the disposition of sensors, or the like, is required.

Another method for solving the permutation problem is a method of directly using the phase of a separation filter, rather than taking the converse of the separation filter. However, because this method utilizes W(f) forming a spectrum zero point with respect to a signal source, it cannot be applied to a case in which there are three or more signal sources. Also, this method does not consider statistical characteristics, the performance may be degraded in an area with excessive echo, and information regarding the size and disposition of a sensor array is required.

SUMMARY OF THE INVENTION

An aspect of the present invention provides a method for separating a blind signal capable of solving permutation of a separation filter without advance information regarding a sensor array and thus improving the separation performance.

Another aspect of the present invention provides an apparatus for separating a blind signal through the method for separating a blind signal.

According to an aspect of the present invention, there is provided a method for separating a blind signal, including: converting mixed signals of a time domain collected by using a plurality of sensors into mixed signals of a frequency domain; calculating a separation filter from the mixed signals which have been converted into those of the frequency domain; calculating an inverse filter of the separation filter; calculating the difference in phase between the respective sensors from the calculated inverse filter; permutation-sorting the separation filter by using the calculated phase difference; and separating the mixed signals of the frequency domain by using the permutation-sorted separation filter.

In the calculating of the difference in phase between the sensors from the calculated inverse filter, a certain sensor among the plurality of sensors may be set as a reference sensor, and the difference between the phase of each row of the matrix of the inverse filter and the phase of the row corresponding to the reference sensor may be calculated.

The permutation-sorting of the separation filter may include: estimating a time delay parameter based on the calculated phase difference; calculating permutation-sorting based on the estimated time delay parameter; and permutation-sorting the separation filter by using the calculated permutation-sorting.

In the estimating of the time delay parameter, θ which maximizes a cost function of Equation of $$L = \sum_f \ln p(\Phi(f) \mid \theta) = \sum_f \ln\left\{\sum_l \psi_l \prod_{m=2}^{M} \prod_{n=1}^{N} \sum_k {}_{\phi}(m, l, n, k, f)\right\}$$

(where $N_\phi(m,l,n,k,f) \equiv N(\phi_{mO_l(n)}(f) \mid \tau_{mn}, \sigma_{mn}^2, k)$, $\tau_{mn}$ is a relative delay time for nth signal source to reach mth sensor based on a reference sensor m', $\sigma_{mn}^2$ is a variance, k is a constant, $O_l(n)$ is nth element of lth permutation $O_l$, $\phi_{mn}(f)$ is the phase difference between an mth row of the matrix of the inverse filter and the reference row m', $\psi_l = p(z_{fl}=1)$, $z_{fl}$ is a latent variable, and $\Phi(f)$ is a phase difference matrix), may be estimated.

In the calculating of the permutation-sorting, a permutation-sorting that maximizes a posterior probability of a permutation combination of each frequency may be calculated by using $$O_l^*(f) = \underset{l}{\operatorname{argmax}}\, p(O_l(f) \mid \Phi(f)) = \underset{l}{\operatorname{argmax}}\, p(\Phi(f), O_l(f)).$$

In the permutation-sorting of the separation filter, the whole frequency band may be divided into a low frequency band and a high frequency band based on a predetermined particular frequency, and then the permutation-sorting may be performed.

According to another aspect of the present invention, there is provided an apparatus for separating a blind signal, including: a sensor unit configured to include a plurality of sensors each collecting a mixed signal; a DFT unit converting mixed signals of a time domain provided from the sensors into mixed signals of a frequency domain; an independent component analyzing unit calculating a separation filter from the mixed signals which have been converted into those of the frequency domain; a permutation-sorting unit calculating an inverse filter of the separation filter, calculating a phase difference between sensors from the calculated inverse filter, and permutation-sorting the separation filter by using the calculated phase difference; and a signal separating unit separating the mixed signals of the frequency domain by using the permutation-sorted separation filter.

BRIEF DESCRIPTION OF THE DRAWINGS

The above and other aspects, features and other advantages of the present invention will be more clearly understood from the following detailed description taken in conjunction with the accompanying drawings, in which:

FIG. 6 is a table showing the results of evaluation of performance of the method for separating a blind signal according to an exemplary embodiment of the present invention.

DETAILED DESCRIPTION OF THE PREFERRED EMBODIMENT

The present invention will now be described more fully hereinafter with reference to the accompanying drawings, in which preferred embodiments of the invention are shown.

However, it should be understood that the following exemplifying description of the invention is not meant to restrict the invention to specific forms of the present invention but rather the present invention is meant to cover all modifications, similarities and alternatives which are included in the spirit and scope of the present invention. The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted.

Figure 1:
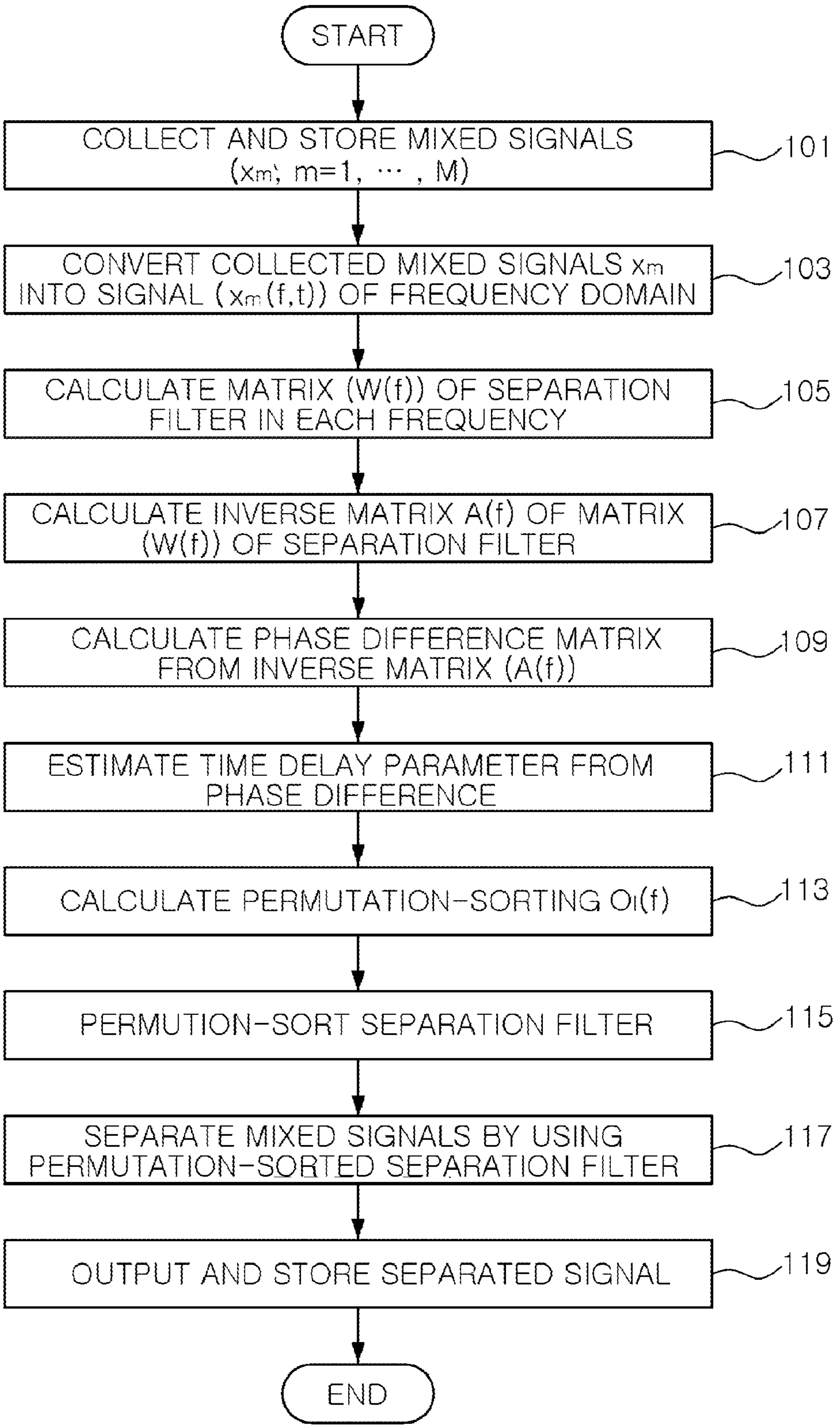
FIG. 1 is a flow chart illustrating the process of a method for separating a blind signal according to an exemplary embodiment of the present invention.
Figure 2:
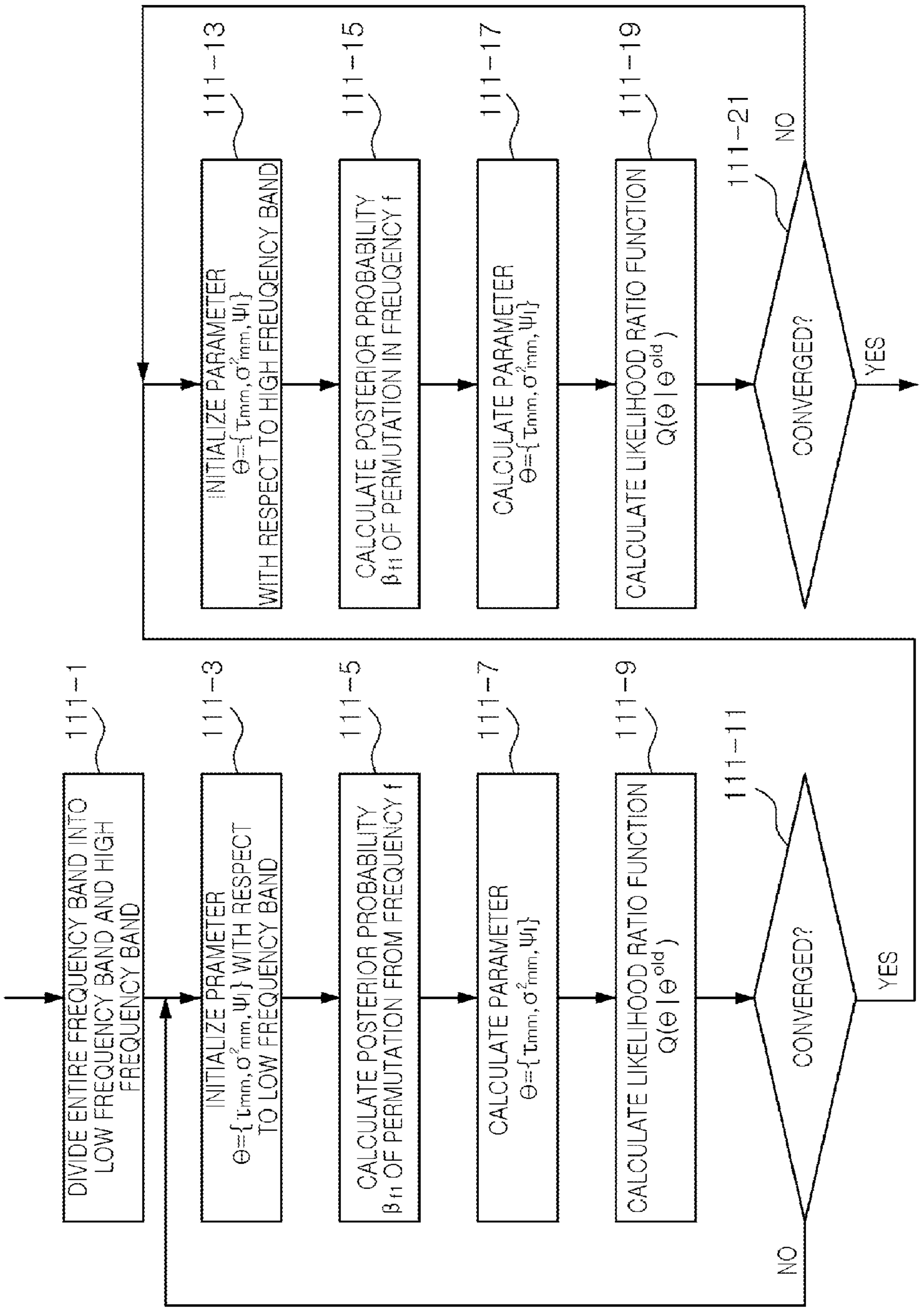
FIG. 2 is flow chart illustrating a process of estimating a parameter illustrated in FIG. 1.

FIG. 1 is a flow chart illustrating the process of a method for separating a blind signal according to an exemplary embodiment of the present invention. The method is performed by an apparatus for separating a blind signal. FIG. 2 is flow chart illustrating a process of estimating a parameter illustrated in FIG. 1.

With reference to FIGS. 1 and 2, first, the blind signal separating apparatus collects N (N is a natural number) number of signal sources, which have reached through multiple paths, through M (M is a natural number) number of sensors and stores the mixed signals $x_m$(m=1, M) collected through the M number of sensors (step 101).

Next, the blind signal separating apparatus converts the collected mixed signals $x_m$ of a time domain into signals $x_m(f,t)$ of a frequency domain through short-time Fourier transform (step 103). Here, the mixed signals $x_m$ of the time domain are multiplied by a window function and then converted into the signals of the frequency domain. As the window function, a hamming window may be used. Here, f indicates a frequency index, and t indicates a time index.

The blind signal separating apparatus independently and separately processes the mixed signals $x_m(f,t)$, which have been converted into those of the frequency domain, in each frequency f by using an independent component analysis (ICA) to calculate a separation filter matrix W(f) (step 105). Here, the separation filter matrix W(f) is in a randomly permuted state, so a permutation-sorting process is required.

For the permutation-sorting, first, the blind signal separating apparatus calculates an inverse matrix (or an inverse filter) $A(f)=W^{-1}(f)$ of the separation filter matrix W(f) (step 107).

Thereafter, the blind signal separating apparatus performs permutation-sorting by using direction information of the inverse matrix A(f) of the separation filter.

To this end, first, the blind signal separating apparatus calculates a phase difference matrix $\Phi(f)$ from the inverse matrix (or an inverse filter matrix) A(f) of the separation filter (step 109). Here, the blind signal separating apparatus may use a Gaussian mixture model with respect to the phase difference.

In detail, the blind signal separating apparatus calculates the difference in phase between mth row of the inverse filter A(f) of the separation filter and a reference row m' as represented by Equation 7 shown below:

$$\phi_{mn}(f) = \angle\left(\frac{a_{mn}(f)}{a_{m'n}(f))}\right), \quad m = 1, \ldots, M, m \neq m' \quad n = 1, \ldots, N \qquad \text{[Equation 7]}$$

When there is an echo and noise, the average of the phase difference $\phi_{mn}(f)$ may be represented as a random variable of Gaussian probability distribution having an average phase difference of $2\pi\tau_{mn}$ and a variance of ${\sigma_{mn}}^2$.

$$p(\phi_{mn}(f) \mid \tau_{mn}, \sigma_{mn}^2, k) = N(\phi_{mn}(f) \mid \tau_{mn}, \sigma_{mn}^2, k) = \frac{1}{\sqrt{2\pi\sigma_{mn}^2}} \exp\left(-\frac{(\phi_{mn}(f) + 2\pi k - 2\pi f \tau_{mn})^2}{2\sigma_{mn}^2}\right) \qquad \text{[Equation 8]}$$

In Equation 8, a constant k has an integer value, not 0, when there is aliasing. The integer value is determined by $(f,\tau_{mn})$ and may be set within a limited range from −K to K. Here, K may be determined to be different in each frequency according to the disposition and size of the sensor array. When the size of the sensor array is not accurately known, a sufficient larger value may be set.

The probability distribution of $\phi_{mn}(f)$ with respect to every available k value can be represented by Equation 9 shown below:

[Equation 9]

$$p(\phi_{mn}(f)\mid\tau_{mn},\sigma_{mn}^2)=\sum_{k=-K}^{K}N(\phi_{mn}(f)\mid\tau_{mn},\sigma_{mn}^2,k)=\sum_{k=-K}^{K}\frac{1}{\sqrt{2\pi\sigma_{mn}^2}}\exp\left(-\frac{(\phi_{mn}(f)+2\pi k-2\pi f\tau_{mn})^2}{2\sigma_{mn}^2}\right)$$

In order to solve the permutation problem, a combination of permutations that can be generated is defined as $O=\{O_1, \ldots, O_l, \ldots, O_P\}$. Here, P=N! Also, in order to solve the permutation problem by using an expectation maximization scheme, a latent variable $z_{fl}$ is defined as follows.

(1) When the inverse matrix A(f) of the separation filter corresponds to permutation 01 in the frequency f, $z_{fl}$ has a value of 1.

(2) When $$\psi_l=p(z_{fl}=1),\ \sum_l\psi_l=1.$$

When a reference sensor is set to be m'=1 for simplifying the formula, the phase difference may be expressed as a matrix as represented by Equation 10 shown below;

[Equation 10]

$$\Phi(f)=\begin{bmatrix}\phi_{21}(f) & \ldots & \phi_{2N}(f)\\ \vdots & \ddots & \vdots\\ \phi_{M1}(f) & \ldots & \phi_{MN}(f)\end{bmatrix}$$

When it is assumed that the respective phase differences are statistically independent from each other, a probability distribution when it is assumed that an observed phase difference corresponds to a permutation $0_1$ can be expressed as represented by Equation 11 shown below:

[Equation 11]

$$p(\Phi(f)\mid z_{fl}=1)=\prod_{m=2}^{M}\prod_{n=1}^{N}\sum_{k=-K}^{K}N(\phi_{mO_l(n)}(f)\mid\tau_{mn},\sigma_{mn}^2,k)$$

In Equation 11, $0_1(n)$ is nth element of a first permutation $0_1$. Also, the sum of m is for considering the phase difference of all the sensors with respect to the reference sensor.

From the foregoing model, the probability of Φ(f) can be represented by Equation 12 by averaging all the permutations.

[Equation 12]

$$p(\Phi(f)\mid\theta)=\sum_{l=1}^{P}\psi_l p(\Phi(f)\mid z_{fl}=1,\theta)$$

Also, the blind signal separating apparatus estimates a time delay parameter in order to solve the permutation from the calculated phase difference as described above (step 111).

The process of estimating a parameter will now be described in detail with reference to FIG. 2. First, the blind signal separating apparatus divides the whole frequency band into a low frequency band and a high frequency band (step 111-1).

Next, the blind signal separating apparatus defines a parameter to be estimated for the low frequency band as $\theta=\{\tau_{mn},\sigma_{mn}^2,\psi_l\}$, and initializes the parameter $\theta=\{\tau_{mn},\sigma_{mn}^2,\psi_l\}$ with respect to the low frequency band with a suitable value (step 111-3). Here, it is defined as $N_\Phi(m,l,n,k,f)\equiv N(\phi_{mO_l(n)}(f)\mid\tau_{mn},\sigma_{mn}^2,k)$ in order to simplify the formula representation.

In estimating the parameter θ, in a state in which a previous parameter $\theta^{old}$ is given, θ, which maximizes a cost function as represented in Equation 13, is estimated by using an expectation-maximization (EM) technique.

[Equation 13]

$$L=\sum_f \ln p(\Phi(f)\mid\theta)=\sum_f\ln\left\{\sum_l\psi_l\prod_{m=2}^{M}\prod_{n=1}^{N}\sum_k N_\phi(m,l,n,k,f)\right\}$$

To this end, first, when the parameter is given, the blind signal separating apparatus calculates posterior probability $\beta_{fl}$ of the permutation in the frequency f as represented by Equation 14 shown below (step 111-5).

[Equation 14]

$$\beta_{fl}=p(z_{fl}=1\mid\Phi(f),\theta^{old})=\frac{\psi_l\prod_n\prod_m\sum_k N_\phi(m,l,n,k,f)}{\sum_l\psi_l\prod_n\prod_m\sum_k N_\phi(m,l,n,k,f)}$$

And then, an auxiliary function is defined as follows.

[Equation 15]

$$Q(\theta\mid\theta^{old})=\sum_f\sum_l\beta_{fl}\ln\left\{\varphi_l\prod_{m=2}^{M}\prod_{n=1}^{N}\sum_k N_\phi(m,l,n,k,f)\right\}$$

Thereafter, the parameter θ, which maximizes Equation 15, is calculated as represented by Equation 16 to Equation 18 shown below (step 111-7).

[Equation 16]

$$(\tau_{m^*n^*})^{new}=\frac{\sum_{fl}\beta_{fl}\gamma'_{fl}}{\sum_{fl}\beta_{fl}2\pi f^2}$$

[Equation 17]

$$(\sigma_{m^*n^*}^2)^{new}=\frac{\sum_{fl}\beta_{fl}\gamma''_{fl}}{\sum_{fl}\beta_{fl}}$$

[Equation 18]

$$(\psi_l)^{new}=\frac{1}{F}\sum_f\beta_{fl}$$

The estimated value with respect to $\psi_l$ expressed in Equation 18 can be calculated by optimizing Equation 1 such that it satisfies the condition of $$\sum_l\psi_l=1.$$

Also, in Equation 18, F indicates the total number of discrete frequencies.

In Equation 16, $\gamma'_{fl}$ is expressed as shown in Equation 19 below, and in Equation 17, $\gamma''_{fl}$ is expressed as shown in Equation 20 below:

$$\gamma'_{fl} = \frac{\sum_k N_\phi(m^*, l, n^*, k, f)(\phi_{m^* O_l(n^*)}(f) + 2\pi k)f}{\sum_k N_\phi(m^*, l, n^*, k, f)} \quad \text{[Equation 19]}$$

$$\gamma''_{fl} = \frac{\sum_k N_\phi(m^*, l, n^*, k, f)(\phi_{m^* O_l(n^*)}(f) + 2\pi k - 2\pi f \tau_{m^* n^*})^2}{\sum_k N_\phi(m^*, l, n^*, k, f)} \quad \text{[Equation 20]}$$

Thereafter, the blind signal separating apparatus calculates a likelihood ratio function $Q(\theta|\theta^{old})$ by using Equation 15 (step 111-9).

Then, the blind signal separating apparatus determines whether or not the parameter estimation has been converged based on the previously likelihood ratio function calculation results (step 111-11). When it is determined that the parameter estimation has not been converged, the blind signal separating apparatus returns to step 111-3 and repeatedly performs steps 111-3 to 111-11.

When it is determined that the parameter estimation has been sufficiently converged in step 111-11, the blind signal separating apparatus performs step 111-13 to initialize the parameter $\theta=\{\tau_{mn},\sigma_{mn}^2,\psi_l\}$ with respect to the high frequency band with a proper value (step 111-13).

Thereafter, the blind signal separating apparatus performs steps 111-15 to 111-21 in the same manner as steps 111-5 to 111-11 preformed at the low frequency band, to estimate a parameter with respect to the high frequency band.

When the estimation of the parameter is completed according to the process illustrated in FIG. 2, the blind signal separating apparatus calculates permutation-sorting $O_l(f)$ (step 113). To this end, first, the blind signal separating apparatus calculates a joint probability between an observed phase difference and a permutation as represented by Equation 21 shown below:

$$p(\Phi(f), O_l(f)) = \psi_l \prod_m \prod_n \sum_k N_\phi(m, l, n, k, f) \quad \text{[Equation 21]}$$

A posterior probability of the phase difference over the permutation given by the Bayes rule can be represented by Equation 22 shown below:

$$p(O_l(f) \mid \Phi(f)) = \frac{p(\Phi(f), O_l(f))}{p(\Phi(f))} = \frac{p(\Phi(f), O_l(f))}{\sum_l p(\Phi(f), O_l(f))} \quad \text{[Equation 22]}$$

A desired permutation-sorting can be determined as represented by Equation 23 shown below, from Equation 22, such that the posterior probability is maximized.

$$O_l^*(f) = \underset{l}{\operatorname{argmax}}\, p(O_l(f) \mid \Phi(f)) = \underset{l}{\operatorname{argmax}}\, p(\Phi(f), O_l(f)) \quad \text{[Equation 23]}$$

Thereafter, the blind signal separating apparatus performs permutation-sorting on the separation filter W(f0 by using the permutation-sorting of Equation 23 (step 115), and then separates the mixed signals by using the separation filter of which permutation-sorting has been solved (step 117).

And then, the blind signal separating apparatus outputs and stores the separated signals (step 119).

Figure 3:
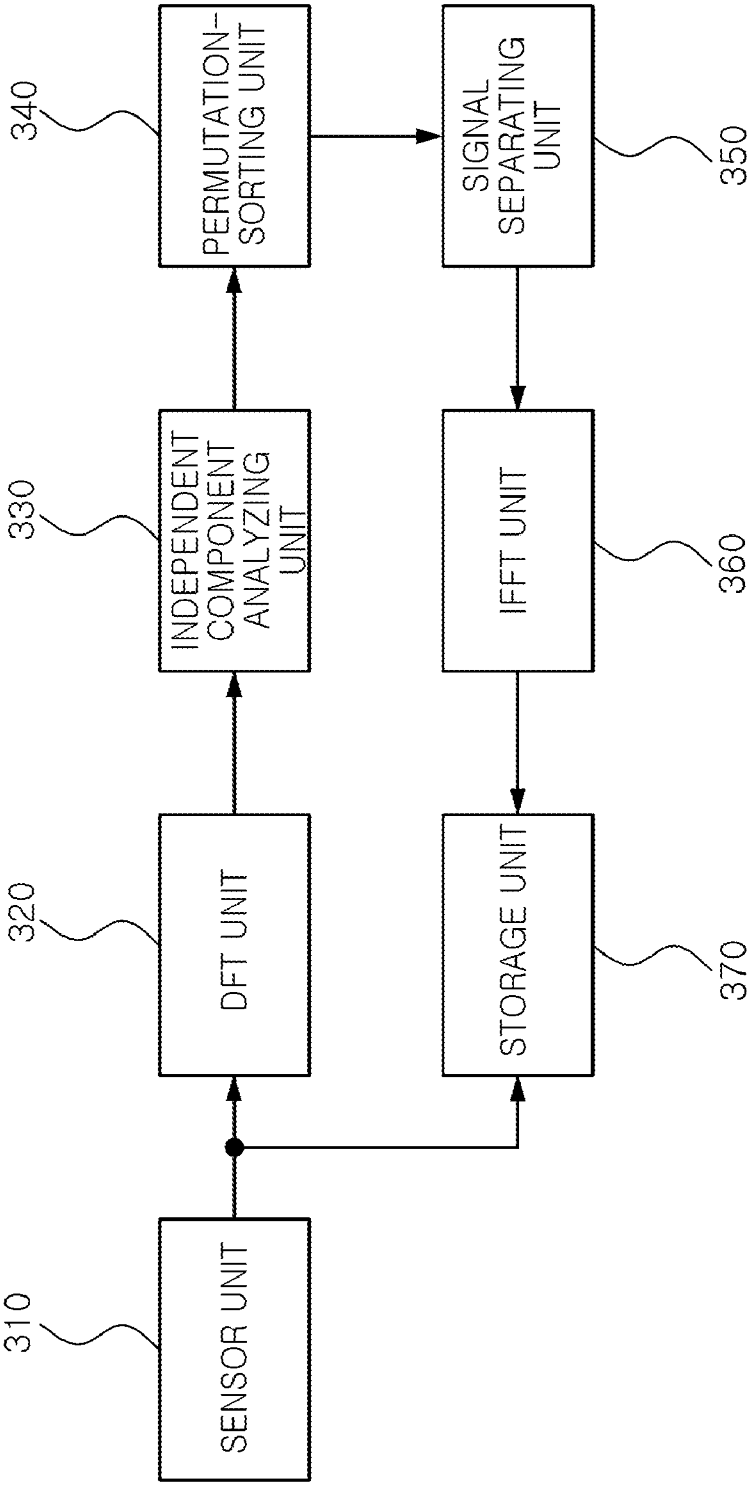
FIG. 3 is a schematic block diagram of an apparatus for separating a blind signal according to an exemplary embodiment of the present invention.

FIG. 3 is a schematic block diagram of an apparatus for separating a blind signal according to an exemplary embodiment of the present invention.

With reference to FIG. 3, the blind signal separating apparatus according to an exemplary embodiment of the present invention may include a sensor unit 310, a DFT unit 320, an independent component analyzing unit 330, a permutation-sorting unit 340, a signal separating unit 350, an IFFT (Inverse Fast Fourier Transform) unit 360, and a storage unit 370.

The sensor unit 310 may include a plurality of microphones (sensors) configured in the form of an array, and each of the sensors collects mixed signals $x_m$(m=1, M) of multiple paths. Here, the mixed signals $x_m$ collected through the sensor unit 310 may be provided to the DFT unit 320 and, simultaneously, stored in the storage unit 370.

The DFT unit 320 receives the mixed signals $x_m$ of the time domain from the sensor unit 310 and performs discrete Fourier transform on the received mixed signals $x_m$ to convert them into signals $x_m$(f,t) of the frequency domain. Here, the DFT unit 320 may multiply the collected mixed signals $x_m$ of the time domain by a window function and then convert them into the signals $x_m$(f,t) of the frequency domain through the short-time Fourier transform.

The independent component analyzing unit 330 receives the mixed signals $x_m$(f,t) which have been converted into those of the frequency domain, from the DFT unit 320 and performs independent component analysis (ICA) on the received signals to calculate a separation filter matrix W(f) with respect to each frequency f.

The permutation-sorting unit 340 calculates an inverse matrix A(f) of the separation filter matrix W(f) provided from the independent component analyzing unit 330, calculates a phase difference matrix from the inverse matrix A(f), calculates permutation-sorting by estimating a time delay parameter from the phase difference, and then sorts the permutation of the separation filter matrix W(f).

Here, the permutation-sorting unit 340 may perform the steps 107 to 115 in FIGS. 1 and 2, so a detailed description thereof will be omitted.

The signal separating unit 350 separates the mixed signals by using the separation filter, whose permutation has been sorted, provided from the permutation-sorting unit 340.

The IFFT unit 360 performs IFFT on the separated signals of the frequency domain provided from the signal separating unit 350 to convert them into signals of the time domain.

The storage unit 370 stores the signals which have been converted into those of the time domain.

The DFT unit 320, the independent component analyzing unit 330, the permutation-sorting unit 340, the signal separating unit 350, and the IFFT (Inverse Fast Fourier Transform) unit 360 may be implemented in the form of a software program which can be read from an information processing device such as a computer, or the like, and executed, or may be implemented in the form of hardware, such as specifically devised ASIC (Application Specific Integrated Circuits), a digital signal processor, or the like, or a combination of hardware and software.

For example, when the blind signal separating apparatus as illustrated in FIG. 3 is implemented as a software program and executed in a computer, in a conference room in which people are present, the voices of people or music and background noise are collected through a microphone array (namely, the sensor unit 310) and transmitted to the computer. The computer performs the signal separation process as illustrated in FIGS. 1 and 2 to separate the mixed signals into independent signals. Through this process, the background noise, which was included in the mixed signals, is canceled, and the noise-canceled signals are recorded or stored. The stored separation signals may be transmitted to a voice recognizing device (or a voice/audio communication device). Here, when the voice recognizing device is in use, the separated voice is interpreted by the voice recognizing device so as to be converted into a computer command or characters, and when a voice coding device is in use, a call having clearer sound quality can be provided. In this manner, the blind signal separating apparatus can be utilized as a pre-processor of a voice recognizing device or a voice communication device.

Figures 4A, 4B, 4C:
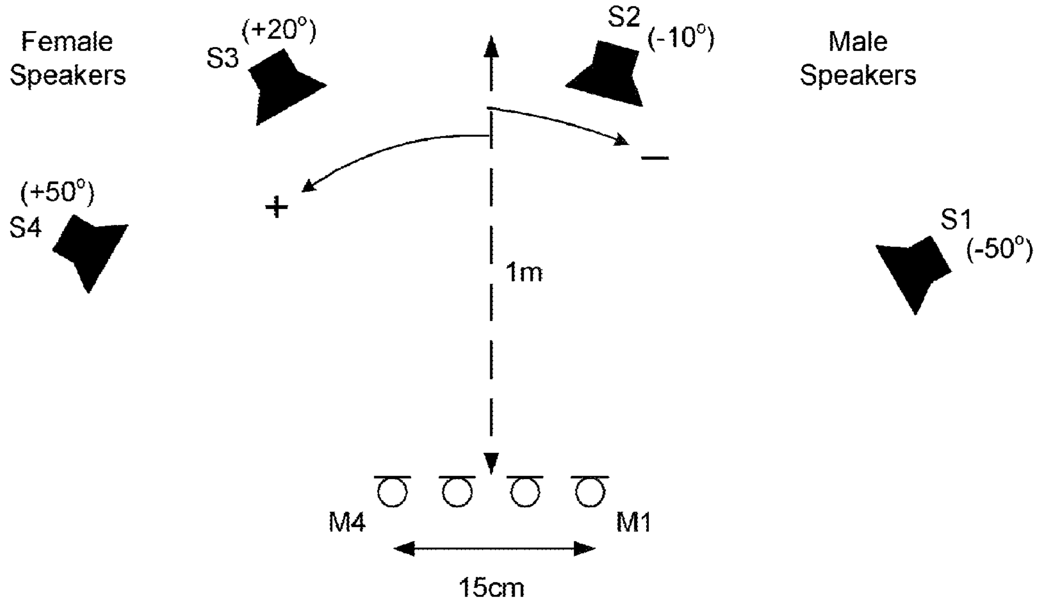
FIGS. 4*a*, 4*b* and 4*c* are view illustrating an environment for evaluating the method for separating a blind signal according to an exemplary embodiment of the present invention.

FIGS. 4*a*, 4*b* and 4*c* are view illustrating an environment for evaluating the method for separating a blind signal according to an exemplary embodiment of the present invention.

As shown in FIG. 4*a*, the sensor (microphone) and a signal source (voice signal) were disposed to evaluate the performance of the blind signal separating method. The signal used for the performance, evaluation experiment was a voice signal sampled by 16 kHz and had a length of 10 seconds.

Mixed signals were acquired by measuring an impulse response in an actual laboratory space as shown in FIGS. 4*a*, 4*b* and 4*c* and then convoluting it with a voice signal by using a computer. In this case, an echo time of the experiment space was measured to be approximately 500 msec.

The mixed signals collected by the sensor (microphone) were selected with a hamming window having a length of 2048 samples so as to have a 50% overlap and then converted into signals of the frequency domain through FFT (Fast Fourier Transform).

In the performance evaluation experiment, the performances of various combinations of microphone-voice signals were compared. A separation performance was expressed by a SIR (Signal-to-Interference Ratio), and an SDR (Signal-to-Distortion Ratio). Here, the separation performance was calculated by using BSS EVAL MATLAB Toolbox (R. Gribonval, C. Fevotte, and E. Vincent, BSS EVAL Toolbox User GuideRevision 2.0, IRISA Technical Report 1706, April 2005).

In the performance evaluation experiment, the low frequency and high frequency bands were classified based on 1562.5 Hz (discrete frequency index f=200).

In order to use a proper initial value required for a sufficient convergence in a parameter estimation process, $\tau_{mn}$ was initialized as shown in FIG. 4*c*. Also, other parameters were initialized into $\sigma_{mn}^2 1$ and $\psi_l=1/P$, respectively. The initial values were uniformly applied to every m. It was noted that, even without information regarding the size and disposition of the sensor array, the initial values were sufficiently converged with respect to various combinations of sensors and signal sources including the combination shown in FIG. 4*b*.

Figure 5:
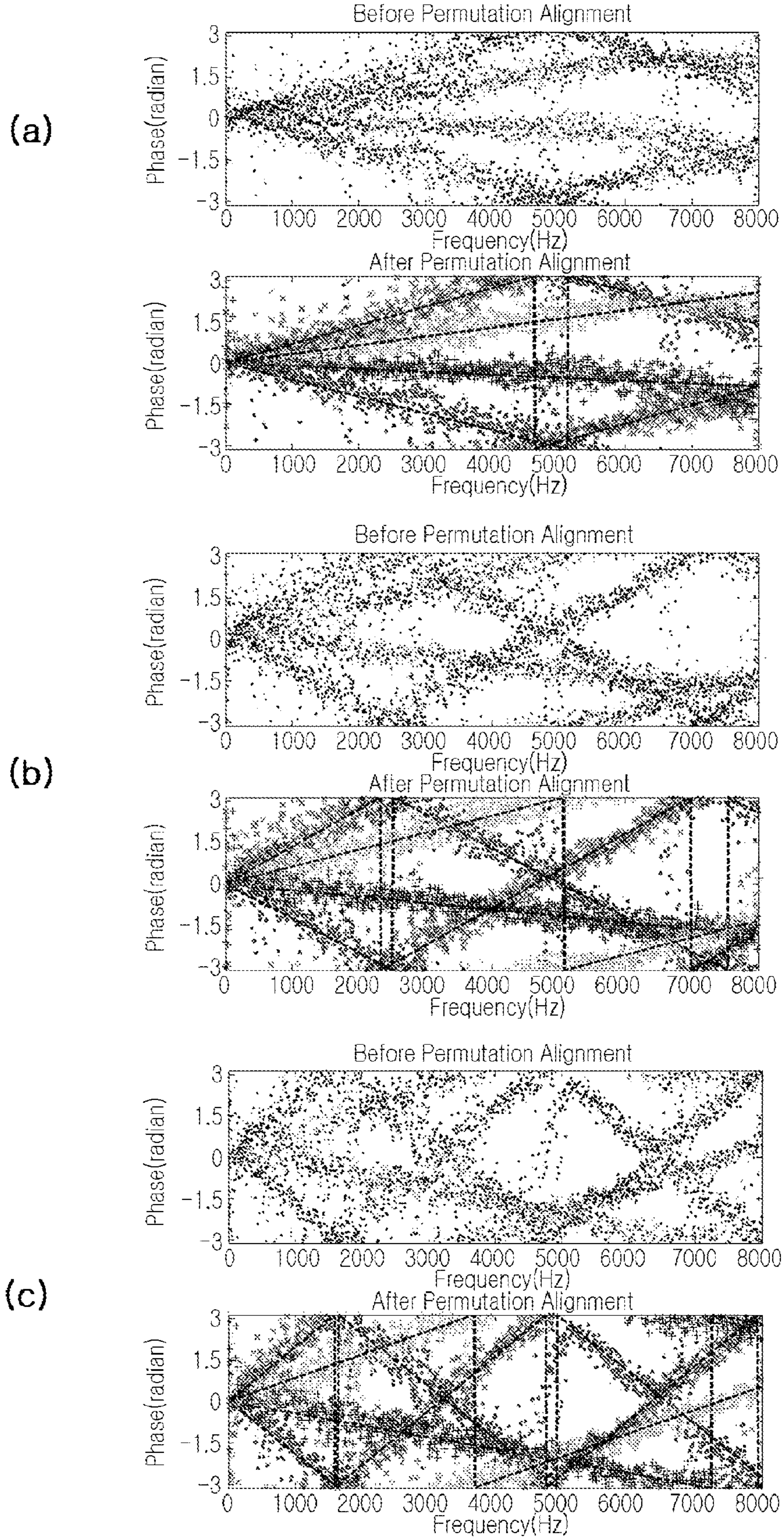
FIG. 5 is graphs showing the results of evaluation of performance of the method for separating a blind signal according to an exemplary embodiment of the present invention.

FIG. 5 is graphs showing the results of evaluation of performance of the method for separating a blind signal according to an exemplary embodiment of the present invention, and FIG. 6 is a table showing the results of evaluation of performance of the method for separating a blind signal according to an exemplary embodiment of the present invention.

FIGS. 5*a*, 5*b*, and 5*c* show the phase difference results before and after the permutation-sorting performed on the m=2nd, 3rd, and 4th rows when the first row (m'=1) of A(f) was set as a reference sensor, in the case of four signal sources (six ones in case of FIG. 4*b*). The results show the basic characteristics of the permutation-sorting using direction information of the signal sources.

The results illustrated in FIG. 5 reveal the fact that as the interval between sensors is short, a time delay is relatively small, so the permutation-sorting in the low frequency band is not easy, while the permutation-sorting is relatively easy in the high frequency band. Meanwhile, when the interval between sensors is large, sorting of the frequency band is easy, but in the high frequency band, phase difference patterns becomes complicated due to aliasing, making sorting at intersection points difficult. This problem can be improved by using all the pairs of sensors (every m), rather than using only a pair of sensors (one m) in Equation 10 and Equation 11. This phenomenon can be confirmed through the performance evaluation results illustrated in FIG. 6. In FIG. 6, EM-1 shows the case in which only one pair of sensors is used, and EM-A11 shows the case in which all the pairs of sensors are used.

FIG. 6 shows the results obtained by comparing the blind signal separating method according to an exemplary embodiment of the present invention from the related method (H. Sawada et al. "Solving the permutation problem of frequency-domain BSS when spatial aliasing occurs with wide sensor spacing, in Proc. ICASSP 2006).

The conventional Sawada method does not use statistical characteristics, so an initial estimated value at the low frequency band is not precise, or when the phase patterns of the high frequency band are complicated, clustering in the vicinity of the intersection points of the phase patterns fails. This kind of error tends to be reflected in the final results as it is, without being corrected. This problem may be reduced to a degree by setting the reference sensor as a central sensor of the sensor array, but in this case, information regarding the disposition of the sensor array is required.

In comparison, the blind signal separating method according to an exemplary embodiment of the present invention provides substantially the same separation performance without the necessity of the size and disposition of the sensor array. Also, when the information regarding the sensor array such as the disposition of the sensors, or the like, the time delay can be converted into the direction of signal sources in Equation 6 and Equation 7. Thus, the direction of the signal sources can be estimated through the blind signal separating method according to an exemplary embodiment of the present invention.

As described above, in the blind signal separating method according to an exemplary embodiment of the present invention, because every information regarding the mixed signals collected from all the sensors are effectively used, the performance of signal separation can be improved, the selection of the reference sensor does not substantially affect the separation performance, and the constantly uniform signal separation performance can be obtained without advance information regarding the disposition of the sensors and signal sources. In addition, when the information regarding the disposition of the sensors is acquired, the direction of the signal sources can be accurately calculated.

As set forth above, according to exemplary embodiments of the invention, because permutation problem of a separation filter is solved by using the statistical characteristics, an excellent separation performance can be provided even in an environment in which there is excessive echo, without advance information regarding the size of a sensor array or the disposition of sensors. Also, a time delay calculated by using the method according to an exemplary embodiment of the present invention can be utilized for estimating the direction of a signal source by using the information regarding the sensor disposition.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for separating a blind signal, the method comprising:

converting mixed signals of a time domain collected by using a plurality of sensors into mixed signals of a frequency domain;

calculating a separation filter from the mixed signals which have been converted into signals of the frequency domain;

calculating an inverse filter of the separation filter;

calculating the difference in phase between the respective sensors from the calculated inverse filter to generate a calculated phase difference by:

setting a certain sensor selected from the plurality of sensors as a reference sensor; and calculating a difference between a phase of each row of a matrix of the inverse filter and a phase of a row corresponding to the reference sensor;

permutation-sorting the separation filter to generate a permutation-sorted separation filter by using the calculated phase difference; and separating the mixed signals of the frequency domain by using the permutation-sorted separation filter.

2. The method of claim 1, wherein the permutation-sorting of the separation filter comprises:

estimating a time delay parameter based on the calculated phase difference to generate an estimated time delay parameter;

calculating permutation-sorting based on the estimated time delay parameter to generate a calculated permutation-sorting; and permutation-sorting the separation filter by using the calculated permutation-sorting.

3. The method of claim 2, wherein estimating the time delay parameter further comprises estimating θ which maximizes a cost function of an Equation $$L = \sum_f \ln p(\Phi(f) \mid \theta) = \sum_f \ln\left\{ \sum_l \psi_l \prod_{m=2}^{M} \prod_{n=1}^{N} \sum_k N_\phi(m, l, n, k, f) \right\}$$

(where $N_\Phi(m,l,n,k,f) \equiv N(\phi_{mO_l(n)}(f) \mid \tau_{mn}, \sigma_{mn}^2, k)$, $\tau_{mn}$ is a relative delay time for $n^{th}$ signal source to reach $m^{th}$ sensor based on a reference sensor m', $\sigma_{mn}^2$ is a variance, k is a constant, $O_l(n)$ is $n^{th}$ element of $1^{th}$ permutation $O_l$, $\phi_{mn}(f)$ is the phase difference between an $m^{th}$ row of the matrix of the inverse filter and the reference row m', $\psi_l = p(z_{fl}=1)$, $z_{fl}$ is a latent variable, and $\phi(f)$ is a phase difference matrix).

4. The method of claim 3, wherein calculating permutation-sorting further comprises calculating a permutation-sorting that maximizes a posterior probability of a permutation combination of each frequency by using $$O_l^*(f) = \underset{l}{\text{argmax}}\, p(O_l(f) \mid \Phi(f)) = \underset{l}{\text{argmax}}\, p(\Phi(f), O_l(f)).$$

5. The method of claim 1, wherein permutation-sorting the separation filter further comprises dividing the frequency domain into a low frequency band and a high frequency band based on a predetermined particular frequency, and then performing the permutation-sorting.

6. An apparatus for separating a blind signal, the apparatus comprising:

a sensor unit configured to include a plurality of sensors each collecting a mixed signal;

a DFT unit converting mixed signals of a time domain provided from the sensors into mixed signals of a frequency domain;

an independent component analyzing unit calculating a separation filter from the mixed signals which have been converted into those of the frequency domain;

a permutation-sorting unit calculating an inverse filter of the separation filter, calculating a phase difference between sensors from the calculated inverse filter, and permutation-sorting the separation filter to generate a permutation-sorted separation filter by using the calculated phase difference, wherein the permutation-sorting unit sets a certain sensor, among the plurality of sensors, as a reference sensor, and calculates the difference in phase between the phase of each row of the matrix of the inverse filter and the phase of the row corresponding to the reference sensor; and a signal separating unit separating the mixed signals of the frequency domain by using the permutation-sorted separation filter.

7. The apparatus of claim 6, wherein the permutation-sorting unit estimates a time delay parameter based on the calculated phase difference, calculates a permutation-sorting based on the estimated time delay parameter, and permutation-sorts the separation filter by using the calculated permutation-sorting.

8. The apparatus of claim 6, wherein the permutation-sorting unit performs permutation-sorting by dividing the whole frequency band into a low frequency band and a high frequency band based on a predetermined particular frequency.

* * * * *